UNITED STATES PATENT OFFICE.

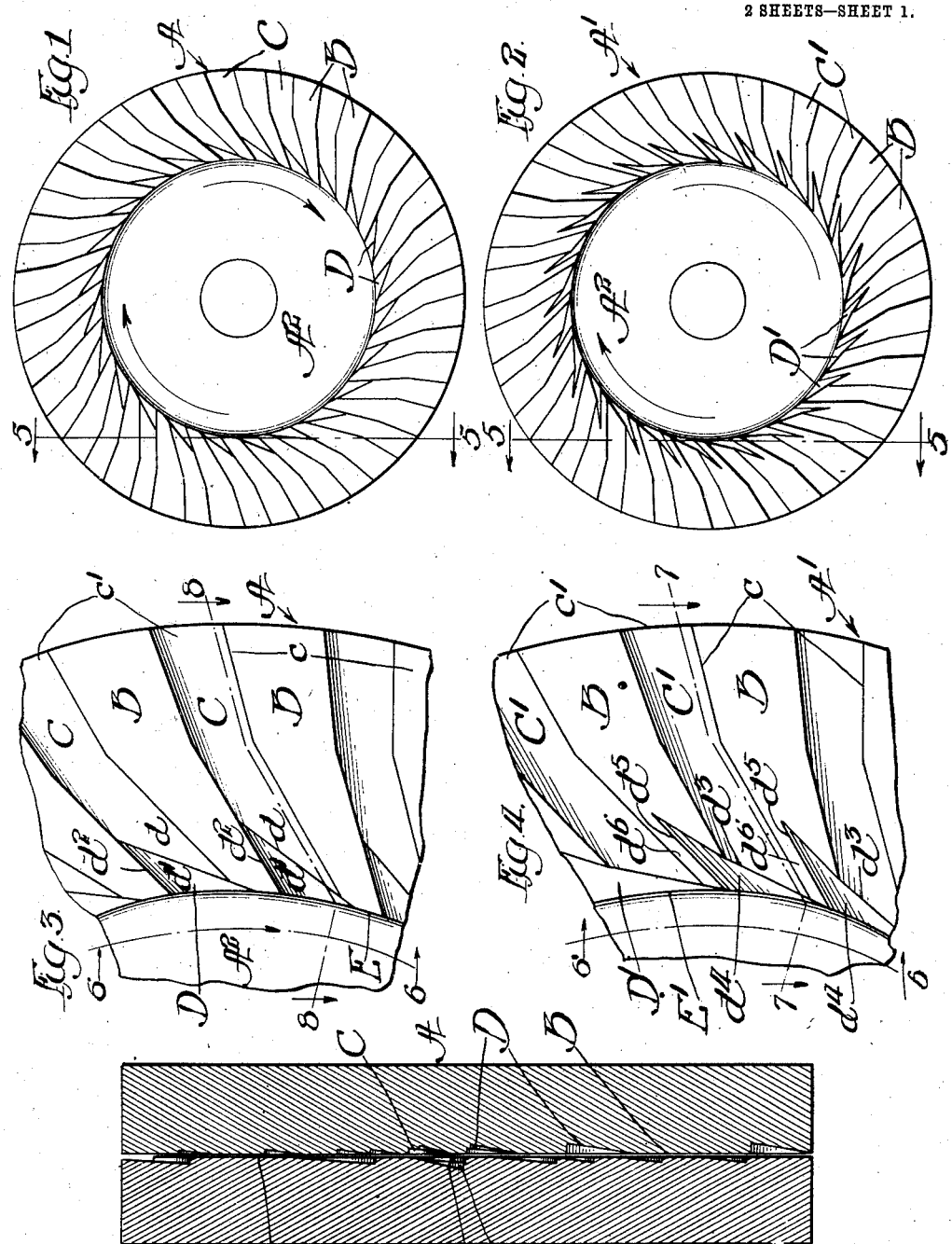

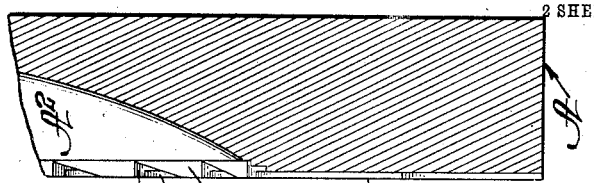
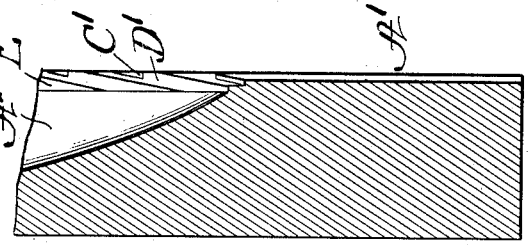
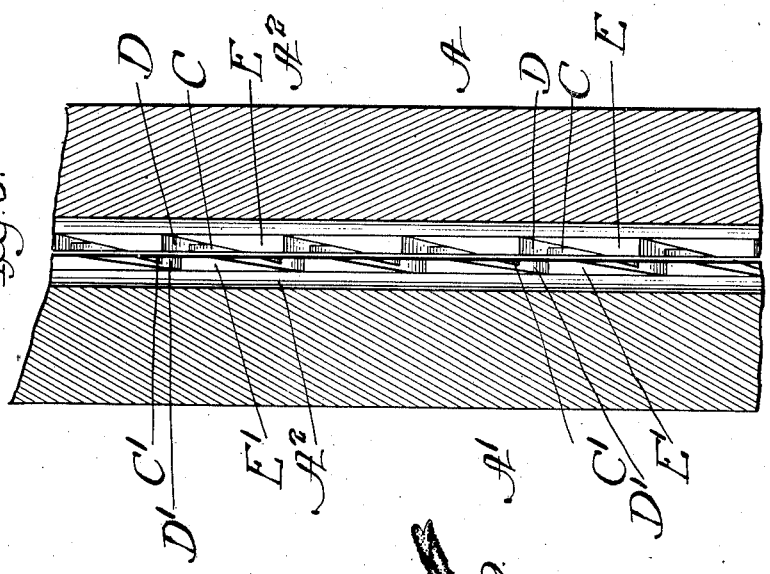

CHARLES H. RICHARDS, OF CHICAGO, ILLINOIS, ASSIGNOR OF THREE-FOURTHS TO LOUIS ARMSTRONG, OF CHICAGO, ILLINOIS.

PROCESS OF MAKING CEREAL FOOD PRODUCTS.

No. 901,647.  Specification of Letters Patent.  Patented Oct. 20, 1908.

Application filed June 3, 1907. Serial No. 377,036.

*To all whom it may concern:*

Be it known that I, CHARLES H. RICHARDS, a citizen of the United States, and a resident of Chicago, in county of Cook and State of Illinois, have invented certain new and useful Improvements in Processes of Making Cereal Food Products; and I do hereby declare that the following is a full, clear, and exact description thereof, reference being had to the accompanying drawings, and to the letters of reference marked thereon, which form a part of this specification.

This invention relates to a novel process for manufacturing a cereal food product, and the invention consists in the matters hereinafter set forth and more particularly pointed out in the appended claims.

In carrying out my process to produce said cereal product, the granules or particles of the particular cereal selected are first moistened to soften the same. Thereafter the softened particles are subject to pressure between relatively moving surfaces which cause said particles to change their shape and texture, and also dry the same. The moving surfaces herein illustrated by which the cereal particles are thus treated are so shaped as to first flatten the particles into wafer like forms and the flattened particles or wafers are thereafter rolled up or twisted to give final or finished form to the product. The flattening or reducing of the individual granules or particles of the cereal and the subsequent rolling thereof take place under conditions which remove the moisture from the material, imparted thereto during the softening operation, so that the finished product is dry and crisp and is ready without further preparation to be placed in packages for shipping. The softening of the particles or granules of the cereal may be best accomplished by subjecting the cereal to a cooking process, when the cereal is of a nature requiring cooking. The treatment of the softened material between relatively moving surfaces, which acts to first flatten the particles and then to roll up the flattened particles individually into finished form, may be accomplished in an apparatus comprising in part a pair of stones or disks having their adjacent faces parallel, closely spaced, and dressed in such manner as to provide relatively moving, opposed inclined surfaces which receive the particles of cereal and subject the same to pressure to flatten the same; and other inclined surfaces which receive said flattened particles and roll the same into their final or finished form. In operating upon particles varying considerably in their dimensions the relatively moving inclined surfaces of the disks or stones may operate to break up the larger particles. The heat generated between the rapidly revolving disks or stones and the material which is being flattened and rolled between them has the effect to substantially heat the material being operated upon and the opposing disks or stones, and the air circulating about the flattening and rolling stones or disks serves to carry away the heated moisture laden air with the result of removing the moisture from the material and leaving the material after it has been subjected to final treatment in the form of a dry and crisp substance. The granules or cereal particles after being flattened and rolled in the manner described are discharged in the form of elongated, generally cylindric particles which have a general volute formation and also a spiral or twisted rope-like formation, of different lengths depending upon the size of the individual particles from which the finished product has been formed. After the dry cylinders or curls receive their finished form they absorb more or less moisture from the atmosphere which has the effect of slightly toughening the same so that the product may be handled without danger of it breaking down or being reduced to powder. When used as a breakfast food, it is desirable to heat or toast the product before serving, thus drying out the moisture taken up thereby from the atmosphere and restoring the product to its original freshness and crispness. The step of the process of subjecting the granular cereal to moisture or moisture and heat to soften the same will vary in time in accordance with the properties of the particular cereal used.

For a full and complete disclosure of the process as applied to the treatment of hominy to produce the food product, I may state that I have subjected the hominy to a boiling or cooking process in a closed vessel for from fifty to sixty minutes under a pressure of twenty pounds of steam and its correlative temperature to render the hominy soft for the subsequent flattening and rolling treatment. For other cereals the period of subjecting the same to the softening process will be varied according to the properties of the cereal. Furthermore, the cylinder-like curls of the finished product may be varied in dimensions by varying the space by which the flattening surfaces are separated. When a relatively large diameter cylinder or curl is desired, the flattening and rolling surfaces will be spaced farther apart than when the cylinders or curls are to be made of smaller diameter.

The finished product may be given a suitable flavor by either cooking or moistening the cereal particles or granules in the presence of a flavoring material or by applying a suitable flavoring material to the cooked material before it is subjected to the flattening and rolling process.

The food product resulting from the process when carried out with the apparatus herein illustrated comprises rolled or twisted particles, of a general cylindric shape, and of volute-like formation, as stated.

A characteristic property of the food product is its light texture, rendering it highly desirable as a breakfast food, both by reason of its wholesomeness and delicacy of taste and making it also a desirable constituent of a confection. Such lightness of texture results from the pressure to which the particles of cereal are subjected, and from the other mechanical treatment which they receive in the process of forming the novel product; and the step in the process of causing the particles of cereal to assume such a texture is important, irrespective of the shape which the particles finally assume as the result of the treatment.

In carrying out the process, as hereinafter more fully disclosed, the novel food product which results consists of rolled particles of a general cylindric shape and of volute-like formation, but within the spirit and scope of my invention the product resulting from such treatment may consist of particles of other form, and I do not desire to be limited in my invention to particles of food product of any particular form except as hereinafter made the subject of specific claims.

Material from which the food product is made may consist of any suitable granular cereal either in the form of its natural grain or in the form of particles broken or reduced from the natural grain. In most cases the grain will be separated from its integument or hull and embryo before it is subjected to the reducing treatment between the disks or stones.

A form of apparatus adapted to treat a previously softened granular cereal in the manner above described is shown in the accompanying drawings and comprises a pair of mill stones or disks with their faces dressed in the peculiar manner hereinafter described.

As shown in said drawings:—Figures 1 and 2 are plan views of the working faces of the two flattening and rolling disks. Figs. 3 and 4 are enlarged detail plan views of portions of the two disks shown in Figs. 1 and 2, respectively. Fig. 5 is a section taken on lines 5—5 of Figs. 1 and 2, showing the two disks arranged in operative relation to each other. Fig. 6 is a section taken on the lines 6—6 of Figs. 3 and 4 showing the two disks arranged in operative relation to each other. Fig. 7 is a section on the line 7—7 of Fig. 4. Fig. 8 is a section on the line 8—8 of Fig. 3. Fig. 9 is a view showing in perspective an individual cylinder or curl of the novel food product which results from treating a granular cereal in the manner herein described. Fig. 10 is a diagrammatic view partly in section, illustrating the volute formation of one of said cylinders or curls.

As shown in said drawings, A and $A^1$ indicate two millstones or disks which are of the well known annular form and which will usually be arranged in vertical planes with their working faces toward each other and separated a distance dependent upon the size of the particles of finished product which it is desired to produce. Either or both of said disks may be turned or driven in such manner as to afford relative rotative movement between them. The working faces of the disks are of like construction with the exception of a slight difference in the arrangement of the grooves in their working faces, as will hereinafter be explained. Each of said disks has on its inner face a central, concave part or recess $A^2$ into which is fed the material to be acted upon, and an annular marginal grinding surface which is generally flat and parallel with the corresponding surface of the other disk, and on which are formed grooves or furrows and intervening lands or ridges.

Each of the disks is provided on its marginal working portion with alternate lands B and grooves or furrows C $C^1$. The said furrows are arranged to extend from the inner to the outer margin of the annular working surface, and are inclined with respect to radial lines of the disks. The outer parts of the furrows are inclined with respect to the main parts thereof and are at smaller angles with the radial lines of the disks, the purpose of such change in direction of the furrows being to lessen at the outer parts of the disks the rate of outward feed or travel of the material being acted upon. The faces of the lands B B are flat and in planes perpendicular to the axis of rotation of the disks.

Each of the grooves C $C^1$ is formed with a shoulder $c$ at one side thereof, said shoulder being perpendicular to the flat faces of the lands B B, and an inclined bottom surface $c^1$ which extends from the plane of the land and meets the bottom or inner edge of the said shoulder $c$. The two disks are rotated, as shown by the arrows, in a direction to carry the shoulders $c$ of the furrows C C$^1$ in advance of the inclined surfaces $c^1$ thereof. The two disks A A$^1$ are also provided with a series of auxiliary recesses or grooves, located adjacent to and extending outwardly from the central recesses of said disks and of which those in the disk A are indicated by D D and those in the disk A$^1$ are indicated by D$^1$ D$^1$. One of the said grooves D or D$^1$ is located at the inner end of each of the main grooves C C$^1$. Said grooves or recesses D D$^1$ are, moreover, provided with bottom surfaces which are inclined in the same direction as the bottom surfaces of the main grooves C C$^1$, but which are at a greater inclination to the flat surfaces of the lands than the said grooves C C$^1$; said grooves D D$^1$, because of the greater inclination of their bottom surfaces, being of greater depth at their deepest parts than said main grooves C C$^1$.

Between the central recesses of the disks A A$^1$ and the outer annular working faces thereof are formed abrupt annular surfaces or shoulders E E$^1$, as shown in Figs. 6, 7 and 8, and the said auxiliary grooves D D$^1$ open into the said central recesses through said shoulders E E$^1$. Said auxiliary grooves D D$^1$ form openings or spaces through which the material to be treated or acted upon by the disks passes from said central recesses to and between the working faces of said disks. The grooves D D$^1$ in the two disks are generally alike, but as preferably constructed, differ somewhat from each other in the two disks, as will appear from the following: Each of the grooves D is made by cutting perpendicularly into the face of the disk A along a line $d$, which is tangent to a circle of slightly less radius than the inner circumference or shoulder E at the inner edge of the working face of the disk, and by forming an oblique flat face $d^1$ extending from a line $d^2$ which coincides with the shallower edge of the groove D, until it meets the lower edge of the shoulder formed along the line $d$. Said shoulder, indicated by the line $d$, extends across the inner end of the groove C and terminates at the annular surface or shoulder E and is, by reason of the inclination of the bottom face of the groove, of tapered form; being deepest at the line of its intersection with the surface E and extending to a point at its outer end, where it meets the line $d^2$. Each groove D$^1$ in the disk A$^1$ is made by cutting perpendicularly into the face of said disk along a line $d^3$ tangent to the inner circumference or shoulder E$^1$ at the inner margin of the working face of the disk and extending at an angle across the inner end of the groove C$^1$ into the face of the adjacent land B, and by forming an oblique surface $d^4$ constituting the bottom of said groove, which surface extends from a line $d^5$ parallel with the abrupt shoulder of the next adjacent groove C$^1$ to the lower edge or margin of said shoulder $d^3$. Said shoulder $d^3$ is of tapered form and of greatest depth where it meets the annular shoulder E$^1$. By this construction of the groove D$^1$ a narrow land portion $d^6$ forming an extension of the land B on the disk A$^1$ is formed between the trailing edge of said groove D$^1$ and the leading edge of said groove C$^1$.

By inspection of Fig. 6 it will be seen that the construction described in the inner or auxiliary grooves D D$^1$ provides along the annular shoulders E E$^1$ at the inner margins of the working faces of the disks, a series of spaces of considerable width into which the particles of the material being operated upon may enter in the passage of said particles from the central recesses into the space between the working faces of the disks.

The operation of the disks to carry out my novel process is as follows: The material operated upon will usually be cracked and cooked corn or hominy and the same will be fed in a moist condition into the central recess between the two disks. The operation will be the same, however, when the material consists of other cereals, cooked or uncooked. The material fed to the central space between the disks is thrown outwardly by centrifugal force and the particles thereof first enter the spaces formed by and between the inner or auxiliary grooves D D$^1$ which, in the deeper portions thereof, afford spaces wide enough to receive the largest of said particles. As the particles of material pass outwardly along the inclined bottom surfaces of said auxiliary grooves D D$^1$, they are caught between said bottom surfaces of the opposed grooves and carried between the adjacent surfaces of the lands between said auxiliary grooves, whereby each particle is squeezed or compressed to form a flat flake. By such squeezing or compressing, the greater part of the moisture is removed from the particles and carried away by centrifugal force and the outwardly moving air currents due thereto. The flat flakes thus formed, in their outward radial movement, are carried into the main furrows C C$^1$ and being caught between the inclined bottom surfaces of the opposite furrows and between the opposite lands are squeezed, kneaded and rolled in such manner that they become spongy or porous in texture and assume the form of small, elongated flaky cylinders of general volute formation. These cylinders are carried outwardly between the adjacent land surfaces until all moisture has been excluded or driven off by the pressure upon the particles and by the heat due to the friction between the moving surfaces and the material, and the material is discharged at the outer margins of the disks completely dried. The change in the direction of the main furrows C C¹ has the effect of retarding the outward progress of the particles of material so that they will remain a sufficiently long time under the action of the lands to insure the drying thereof before they are discharged from between the disks.

I claim as my invention:—

1. The process of making a cereal food product which consists in cooking the granular cereal until thoroughly softened, and thereafter treating the softened particles between relatively moving surfaces to first reduce the thickness of said particles and then roll them up and to completely dry the same simultaneously with the rolling up step of the process.

2. The process of making a cereal food product which consists in cooking a granular cereal until thoroughly softened, and thereafter treating the softened cooked particles between relatively moving surfaces in a manner to flatten the particles and then roll them up, the action of the relatively moving surfaces on the material being such as to completely dry the same simultaneously with the rolling up step of the process.

3. The process of making a cereal food product which consists in subjecting a granular cereal to moisture to soften the same, and thereafter treating the softened particles between relatively moving surfaces in a manner to first flatten the same and then roll them up, the action of the relatively moving surfaces on the material being such as to completely dry the same simultaneously with the rolling up step of the process.

4. The process of treating hominy to produce a food product which consists in cooking the hominy until thoroughly softened, and thereafter treating the softened particles between relatively moving surfaces to first reduce the thickness of said particles and then roll them up and to completely dry the same simultaneously with the rolling up step of the process.

In testimony, that I claim the foregoing as my invention I affix my signature in the presence of two witnesses, this 27th day of May A. D. 1907.

CHARLES H. RICHARDS.

Witnesses:
GEORGE R. WILKINS,
S. D. HIRSCHE.